United States Patent
Yoshida et al.

(10) Patent No.: US 11,592,418 B2
(45) Date of Patent: Feb. 28, 2023

(54) SOLID ELECTROLYTE, MANUFACTURING METHOD THEREOF, AND GAS SENSOR

(71) Applicant: DENSO CORPORATION, Kariya (JP)

(72) Inventors: Mitsuhiro Yoshida, Kariya (JP); Satoshi Suzuki, Kariya (JP); Makoto Noguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 131 days.

(21) Appl. No.: 16/864,462

(22) Filed: May 1, 2020

(65) Prior Publication Data

US 2020/0256824 A1  Aug. 13, 2020

Related U.S. Application Data

(63) Continuation of application No. PCT/JP2018/038080, filed on Oct. 12, 2018.

(30) Foreign Application Priority Data

Nov. 3, 2017  (JP) .............................. JP2017-213345

(51) Int. Cl.
*G01N 27/407* (2006.01)
*C04B 35/488* (2006.01)
*G01N 27/409* (2006.01)

(52) U.S. Cl.
CPC ..... *G01N 27/4073* (2013.01); *C04B 35/4885* (2013.01); *G01N 27/409* (2013.01)

(58) Field of Classification Search
CPC .............. G01N 27/4073; G01N 27/409; C04B 35/4885
See application file for complete search history.

(56) References Cited

U.S. PATENT DOCUMENTS 4,266,979 A * 5/1981 Miyoshi .............. H01M 8/1253
501/103
4,370,393 A  1/1983 Watanabe et al.
(Continued)

FOREIGN PATENT DOCUMENTS

JP 54109898 A * 8/1979
JP 62108766 A * 5/1987
(Continued)

*Primary Examiner* — Maris R Kessel
*Assistant Examiner* — Vivian A Tran
(74) *Attorney, Agent, or Firm* — Nixon & Vanderhye P.C.

(57) ABSTRACT

A solid electrolyte includes partially stabilized zirconia in which a stabilizer forms a solid solution in zirconia. The partially stabilized zirconia includes at least monoclinic phase particles and cubic phase particles as crystal particles that configure the partially stabilized zirconia, and an abundance ratio of the monoclinic phase particle is 5 to 25% by volume. The partially stabilized zirconia includes stabilizer low-concentration phase particles of which concentration of the stabilizer at a particle center is equal to or less than 1 mol %, as the crystal particles. The stabilizer low-concentration phase particles have a particle-size distribution of number frequency thereof having a peak at which an average particle size is 0.6 to 1.0 μm, and a particle size at 10% of a cumulative number is 0.5 μm or greater, and of the overall low-concentration phase particles, 50% by volume or greater belong to the peak.

13 Claims, 10 Drawing Sheets

(56) References Cited

U.S. PATENT DOCUMENTS

| | | | | |
|---|---|---|---|---|
| 2005/0271919 | A1* | 12/2005 | Hata | C04B 35/63 |
| | | | | 264/618 |
| 2009/0081101 | A1* | 3/2009 | Sugii | C01G 25/00 |
| | | | | 423/263 |
| 2014/0011661 | A1* | 1/2014 | Krstic | C04B 35/486 |
| | | | | 501/134 |
| 2019/0210930 | A1* | 7/2019 | Knohl | C04B 35/62855 |

FOREIGN PATENT DOCUMENTS

| | | | |
|---|---|---|---|
| JP | 62108776 A | * | 5/1987 |
| JP | 09-124365 | | 5/1997 |
| JP | 2000-292406 | | 10/2000 |
| JP | 2004-188958 | | 7/2004 |

* cited by examiner

FIG.2
(a)
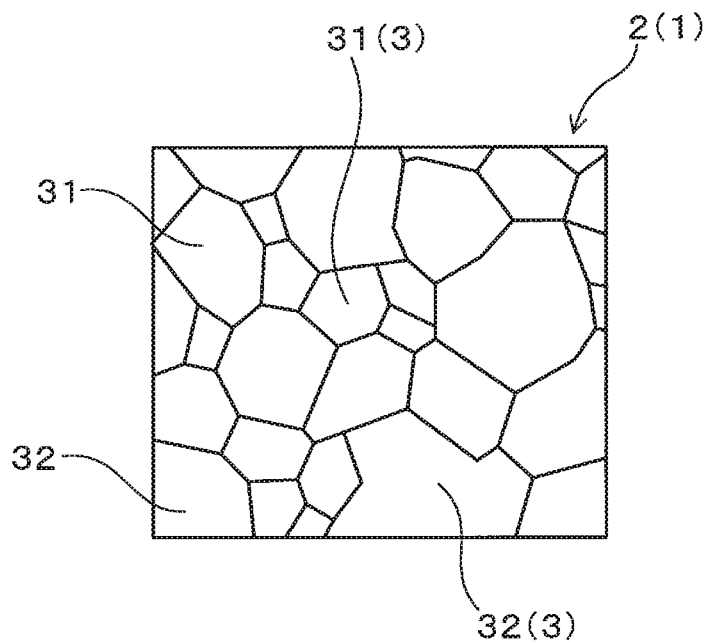
(b)
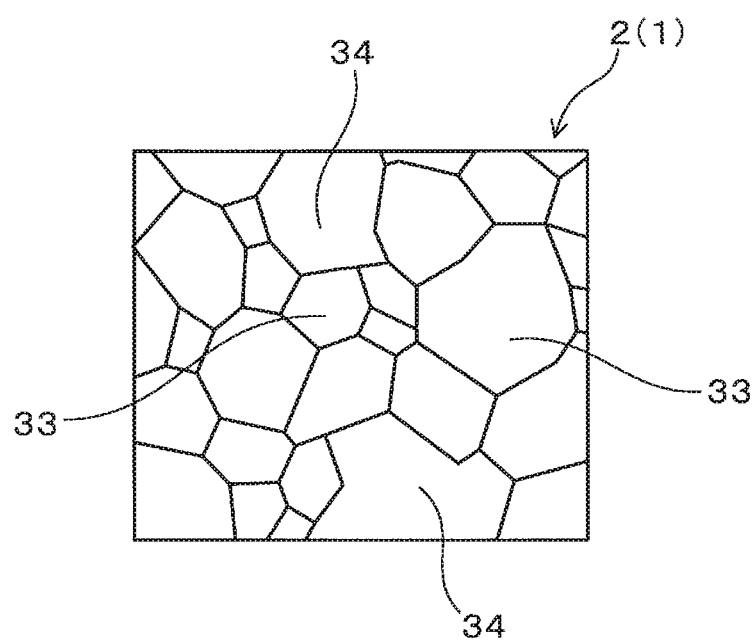

FIG.3
(a)
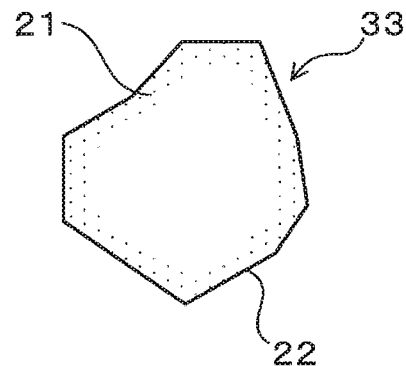
(b)
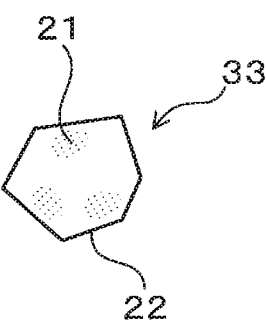
(c)
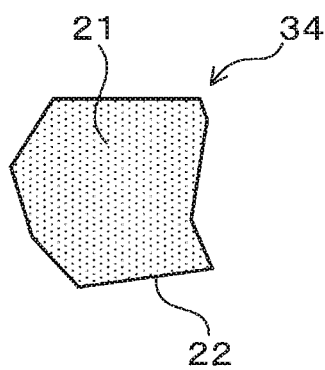

SOLID ELECTROLYTE, MANUFACTURING METHOD THEREOF, AND GAS SENSOR

CROSS-REFERENCE TO RELATED APPLICATIONS

The present application is a continuation application of International Application No. PCT/JP2018/038080, filed Oct. 12, 2018, which claims priority to Japanese Patent Application No. 2017-213345, filed Nov. 3, 2017. The contents of these applications are incorporated herein by reference in their entirety.

BACKGROUND

Technical Field

The present disclosure relates to a solid electrolyte that includes partially stabilized zirconia, a manufacturing method thereof, and a gas sensor that includes the solid electrolyte.

Background Art

A gas sensor element is used in an exhaust system of an internal combustion engine and the like for the purpose of detecting oxygen concentration, air-fuel ratio, and the like within exhaust gas. An oxide-ion-conducting solid electrolyte, such as zirconia, is used in such a gas sensor element.

SUMMARY

An aspect of the present disclosure provides a solid electrolyte includes partially stabilized zirconia in which a stabilizer forms a solid solution in zirconia. The partially stabilized zirconia contains at least monoclinic phase particles and cubic phase particles as crystal particles that configure the partially stabilized zirconia, and an abundance ratio of the monoclinic phase particle is 5 to 25% by volume. The partially stabilized zirconia contains stabilizer low-concentration phase particles of which concentration of the stabilizer at a particle center is equal to or less than 1 mol %, as the crystal particles. The stabilizer low-concentration phase particles have particles have a particle-size distribution of number frequency thereof having a peak at which an average particle size is 0.6 to 1.0 µm, and a particle size at 10% of a cumulative number is 0.5 µm or greater, and of the overall low-concentration phase particles, 50% by volume or greater belong to the peak.

BRIEF DESCRIPTION OF THE DRAWINGS

In the accompanying drawings:

FIG. 2 illustrates, by (a), a schematic diagram of a microstructure based on a crystal system of partially stabilized zirconia and, by (b), a schematic diagram of a microstructure based on a solid solution state of a stabilizer of the partially stabilized zirconia, according to the first embodiment;

FIG. 3 illustrates, by (a), a schematic diagram of a stabilizer low-concentration phase particle having a large particle size, by (b), a schematic diagram of a stabilizer low-concentration phase particle having a small particle size, and, by (c), a schematic diagram of a stabilizer high-concentration phase particle, according to the first embodiment;

DESCRIPTION OF THE EMBODIMENTS

Figure 1:
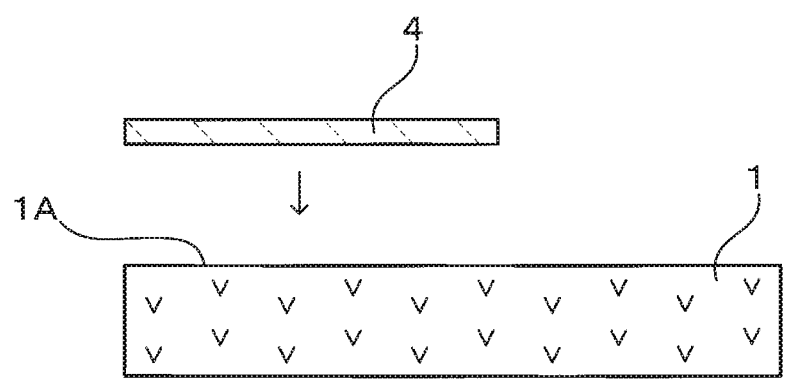
FIG. 1 is a schematic diagram of a cross-section of a solid electrolyte according to a first embodiment.

For example, JP-A-2000-292406 discloses a ceramic laminate that includes a solid electrolyte layer. The ceramic laminate such as this is used in gas sensors and the like. For example, the solid electrolyte layer is used in a state in which the solid electrolyte layer is in contact with a dissimilar material member of a ceramic heater that includes alumina. In addition, in a cup-type gas sensor that has a bottomed cylindrical solid electrolyte, the solid electrolyte is used in a state in which the solid electrolyte is in contact with a dissimilar material member of a protective layer that covers a surface of the solid electrolyte and is made of spinel or the like, or a state in which the solid electrolyte is covered by a protective layer via an electrode of about 1 µm. For example, the protective layer is formed by plasma spraying.

However, a difference in coefficient of thermal expansion may occur between the solid electrolyte that is made of the partially stabilized zirconia and the dissimilar material member. Therefore, damage that is attributed to the difference in coefficient of thermal expansion may occur between the solid electrolyte and the dissimilar material member in a cooling/heating cycle.

For example, in a gas sensor, the difference in coefficient of thermal expansion leads to occurrence of peeling and cracking between the solid electrolyte and the ceramic heater, the protective layer, and the like. In addition, the partially stabilized zirconia has hysteresis in thermal expansion behavior when exposed to temperature increase and temperature decrease. That is, a thermal expansion curve during heating and a thermal expansion curve during cooling do not coincide, and a difference occurs therebetween. The hysteresis tends to increase particularly in high-temperature environments. Increase in hysteresis leads to the occurrence of cracks and fractures in the solid electrolyte itself.

In recent years, as vehicles are being required to follow strict fuel efficiency and emission regulations, for example, reliability in even higher temperature environments is being required of onboard gas sensors due to changes in mounting positions and the like. Meanwhile, frequent stop/start of engines as a result of popularization of hybrid cars, idle-stop cars, and the like has increased in frequency. In addition, heaters are frequently turned off during stopping from the perspective of reducing power consumption. Therefore, high reliability regarding increase in load during the cooling/heating cycle is required.

Here, further stability during the cooling/heating cycle is also required of the solid electrolyte that is used in gas sensors and the like. That is, for example, stability in a higher temperature range that exceeds 1,000° C. is required. In a conventional solid electrolyte, there is room for improvement regarding stability. In particular, in a high-temperature region that exceeds 1,000° C., a monoclinic phase becomes an unstable crystalline phase in the high-temperature region, and hysteresis increases. As a result, for example, in the gas sensor, reliability of use in a high-temperature region that exceeds 1,000° C. decreases.

Its thus desired to provide a solid electrolyte, a manufacturing method thereof, and a gas sensor that uses the solid electrolyte, in which the solid electrolyte has small hysteresis even when exposed to a high-temperature region that, for example, exceeds 1,000° C., is capable of reducing a difference in coefficient of thermal expansion with a dissimilar material member even when used in combination with the dissimilar material member, and has excellent strength.

An exemplary embodiment of the present disclosure provides a solid electrolyte includes partially stabilized zirconia in which a stabilizer forms a solid solution in zirconia. The partially stabilized zirconia contains at least monoclinic phase particles and cubic phase particles as crystal particles that configure the partially stabilized zirconia, and an abundance ratio of the monoclinic phase particle is 5 to 25% by volume. The partially stabilized zirconia contains stabilizer low-concentration phase particles of which concentration of the stabilizer at a particle center is equal to or less than 1 mol %, as the crystal particles. The stabilizer low-concentration phase particles have particles have a particle-size distribution of number frequency thereof having a peak at which an average particle size is 0.6 to 1.0 μm, and a particle size at 10% of a cumulative number is 0.5 μm or greater, and of the overall low-concentration phase particles, 50% by volume or greater belong to the peak.

Another exemplary embodiment of the present disclosure provides a gas sensor that includes the above-described solid electrolyte.

Still another exemplary embodiment of the present disclosure provides a manufacturing method of a solid electrolyte in which the manufacturing method includes: a mixing step of obtaining a mixture by mixing a first raw material powder that is made of zirconia, a second raw material powder of which an average particle size is greater than that of the first raw material powder and that is made of zirconia, and a stabilizer raw material power; a molding step of obtaining a molded body by molding the mixture; and a sintering step of obtaining a solid electrolyte that is made of partially stabilized zirconia by sintering the molded body.

In the solid electrolyte of the above-described configuration, hysteresis is small even when, for example, the solid electrolyte is exposed to a high-temperature region that exceeds 1,000° C.; a difference in coefficient of thermal expansion with a dissimilar material member is small even when the solid electrolyte is used in combination with the dissimilar material member; and strength is high. Details will be described hereafter according to embodiments, experimental examples, and the like. However, a reason is thought to be that, as a result of an abundance ratio of monoclinic phase particles in the solid electrolyte being within the above-described range and the solid electrolyte containing many stabilizer low-concentration phase particles that have suitable particle sizes, for example, the crystal phase of the stabilizer low-concentration phase particles can be present as a stable phase up to a high-temperature region that exceeds 1,000° C.

The above-described gas sensor includes the solid electrolyte that has small hysteresis, as described above. Therefore, for example, even when the gas sensor is exposed to a high-temperature region that exceeds 1,000° C., internal damage does not easily occur. The gas sensor exhibits high reliability that can withstand even a high-temperature environment exceeding 1,000° C.

The above-described solid electrolyte is obtained by the mixing step, the molding step, and the sintering step being performed. At the mixing step, the first raw material powder, the second raw material powder of which the average particle size is relatively larger than that of the first raw material powder, and the stabilizer raw material powder are mixed. The first raw material powder and the second raw material powder are both made of zirconia.

A difference in reactivity with the stabilizer is present between the first raw material powder and the second raw material powder of which the average particle sizes differ. That is, during sintering, the stabilizer less easily forms a solid solution into the second raw material powder, compared to the first raw material powder. As a result, the above-described stabilizer low-concentration phase particles are produced. In this manner, the solid electrolyte of the configuration described above can be obtained.

As described above, according to the above-described exemplary embodiments, a solid electrolyte that has small hysteresis even when exposed to a high-temperature region that, for example, exceeds 1,000° C., and has excellent strength, a manufacturing method thereof, and a gas sensor that uses the solid electrolyte can be provided.

First Embodiment

A solid electrolyte according to an embodiment will be described with reference to FIG. 1 to FIG. 9. As shown in examples in FIG. 1 and FIG. 2 by (a) and (b), and FIG. 3, a solid electrolyte 1 is made of partially stabilized zirconia 2. The partially stabilized zirconia 2 is a so-called sintered body. The partially stabilized zirconia 2 is a sintered body in which a stabilizer 21 forms a solid solution in zirconia 22.

As the stabilizer 21, yttria, calcia, magnesia, scandia, ytterbia, and the like are given as examples. The partially stabilized zirconia 2 can contain at least one type of the foregoing as the stabilizer 21.

As shown in the example in FIG. 2 by (a), the partially stabilized zirconia 2 contains, as crystal particles 3 configuring the partially stabilized zirconia 2, monoclinic phase particles 31 and cubic phase particles 32. In the description hereafter, the monoclinic phase is referred to as "M-phase", as appropriate. The cubic phase is referred to as "C-phase", as appropriate. In addition, the partially stabilized zirconia 2 may contain a tetragonal phase. The tetragonal phase is referred to as "T-phase", as appropriate. The C-phase, M-phase, and T-phase are the crystal particles 3 configuring the partially stabilized zirconia 2 that are classified based on crystal phase structure. That is, the C C-phase, M-phase, and T-phase are crystal particles seen from the perspective of crystal phase.

The M-phase particle 31 is the crystal particle 3 that is made of the M-phase. A coefficient of thermal expansion of the M-phase is 2 to 3 ppm/° C. The C-phase particle 32 is the crystal particle 3 that is made of the C-phase. The coefficient of thermal expansion of the C-phase is 10 to 11 ppm/° C. Here, the T-phase particle is the crystal particle 3 that is made of the T-phase. The coefficient of thermal expansion of the T-phase is 10 to 11 ppm/° C.

An abundance ratio of the M-phase particles 31 in the partially stabilized zirconia 2 is 5 to 25% by volume. The abundance ratio of the M-phase particles 31 is referred to as an M-phase percentage, as appropriate. The M-phase percentage is the percentage of the amount of the M-phase relative to a total amount of the M-phase and the C-phase. Although a method for measuring the M-phase percentage will be described in an experimental example hereafter, the M-phase percentage is determined by X-ray diffraction, and calculated based on intensity of a peak that is derived from the M-phase and intensity of peaks derived from the C-phase and the T-phase.

When the M-phase percentage is less than 5% by volume, the coefficient of thermal expansion of the solid electrolyte 1 increases. Meanwhile, when the M-phase percentage exceeds 25% by volume, the coefficient of thermal expansion of the solid electrolyte 1 decreases.

As a result, in either case, for example, when the solid electrolyte 1 is used such as to be placed in contact with a dissimilar material member 4 that is made of alumina, spinel ($MgAl_2O_4$), or the like of which the coefficient of thermal expansion is 7 to 10 ppm/° C., the difference in coefficient of thermal expansion between the solid electrolyte 1 and the dissimilar material member 4 increases. Consequently, internal damage may occur inside an apparatus, such as a gas sensor, that uses the solid electrolyte 1. Specifically, peeling or cracking may occur between the solid electrolyte 1 and the dissimilar material member 4.

From the perspective of further reducing the difference in coefficient of thermal expansion between the dissimilar material member 4, such as alumina or spinel, and the solid electrolyte 1, the M-phase percentage is preferably equal to or greater than 8% by volume. The M-phase percentage is more preferably equal to or greater than 10% by volume, and even more preferably equal to or greater than 12% by volume. From a similar perspective, the M-phase percentage is preferably equal to or less than 22% by volume. The M-phase percentage is more preferably equal to or less than 20% by volume, and even more preferably equal to or less than 18% by volume.

In addition, as shown in the example in FIG. 2 by (b), the partially stabilized zirconia 2 contains stabilizer low-concentration phase particles 33 as the crystal particles 3 that configure the partially stabilized zirconia 2. Meanwhile, the partially stabilized zirconia 2 may contain stabilizer high-concentration phase particles 34 that do not correspond to the stabilizer low-concentration phase particles 33.

The stabilizer low-concentration phase particle 33 is referred to as a "low-concentration phase particle 33", as appropriate. The stabilizer high-concentration phase particle 34 is referred to as a "high-concentration phase particle 33", as appropriate. The low-concentration phase particles 33 and the high-concentration phase particles 34 are the crystal particles 3 configuring the partially stabilized zirconia 2 that are classified based on a solid solution state of the stabilizer 21. That is, the low-concentration phase particles 33 and the high-concentration phase particles 34 are the crystal particles 3 seen from the perspective of the solid solution state of the stabilizer 21. The solid solution state can also be referred to as a solid-solution distribution state or a solid-solution concentration state of the stabilizer 21.

As shown in the examples in FIG. 3 by (a) and (b), the low-concentration phase particle 33 refers to the crystal particle 3 of which the concentration of the stabilizer 21, such as yttria, at a particle center O is equal to or less than 1 mol %. Measurement of the concentration of the stabilizer 21 is performed by metal elements, such as yttrium, in the stabilizer 21 being measured by scanning electron microscope/energy-dispersive X-ray spectroscopy (that is, SEM/EDX analysis), described hereafter.

Although a specific measurement method will be described hereafter in an experimental example, the concentration of 1 mol % corresponds to a detection limit value of the SEM/EDX analysis apparatus that is used in the experimental example. Therefore, the low-concentration phase particle 33 can also be considered to be the crystal particle 3 of which the concentration of the stabilizer 21 at the particle center O is equal to or less than a detection limit of a specific analysis apparatus in the experimental example.

Figure 4:
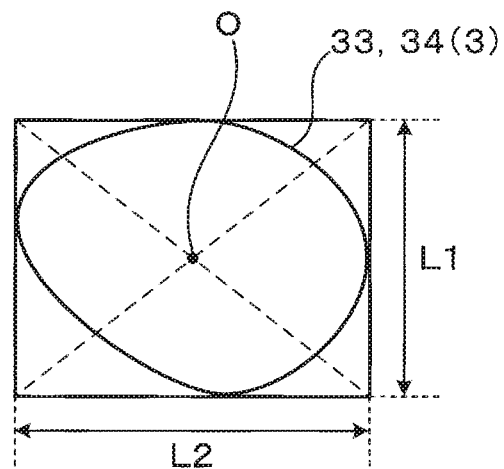
FIG. 4 is an explanatory diagram of a particle center and a particle size of a crystal particle according to the first embodiment.

As shown in an example in FIG. 4, the particle center O of the crystal particle 3 refers to a center of gravity of a rectangle that is surrounded by maximum widths of the particle in a horizontal direction and a vertical direction.

In contrast, as shown in the example in FIG. 3 by (c), the above-described high-concentration phase particle 34 refers to the crystal particle 3 that does not correspond to the low-concentration phase particle 33. That is, the high-concentration phase particle 34 refers to the crystal particle 3 of which the concentration of the stabilizer 21, such as yttria, at the particle center O exceeds 1 mol %.

In a production process for the partially stabilized zirconia 2, the stabilizer 21 is considered to form a solid solution from the surface of a zirconia particle towards the center. It is thought that a concentration gradient in which the solid-solution concentration of the stabilizer 21 decreases from the surface towards the center tends to be formed. Therefore, it is thought that, ordinarily, in the high-concentration phase particle 34 of which the concentration at the particle center O exceeds 1%, the stabilizer 21 forms a solid solution throughout the overall crystal particle 3.

Figure 5:
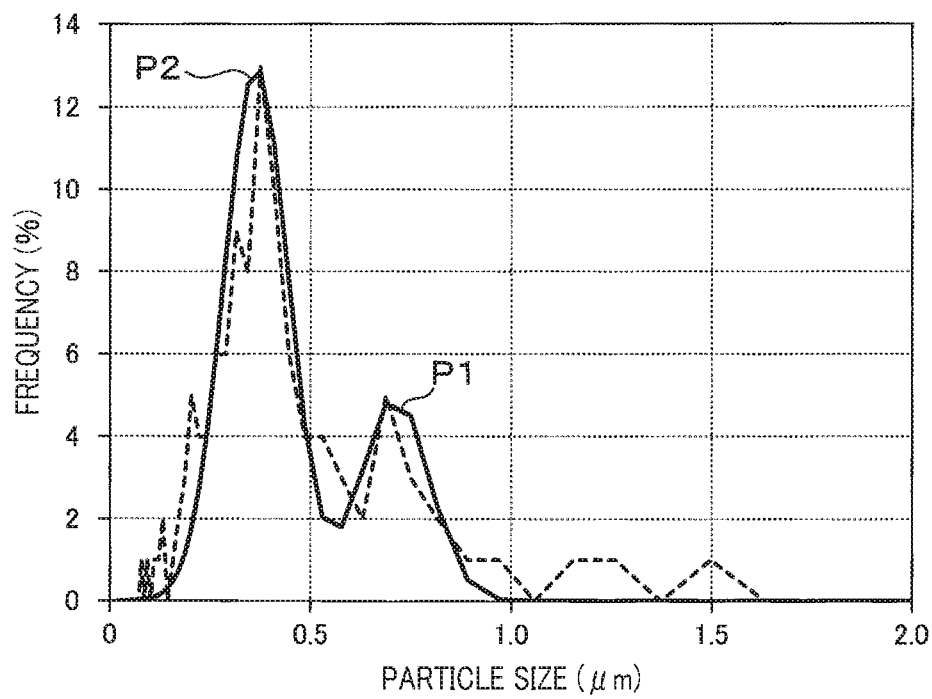
FIG. 5 is a particle-size distribution diagram of the stabilizer low-concentration phase particles according to the first embodiment.
Figure 6:
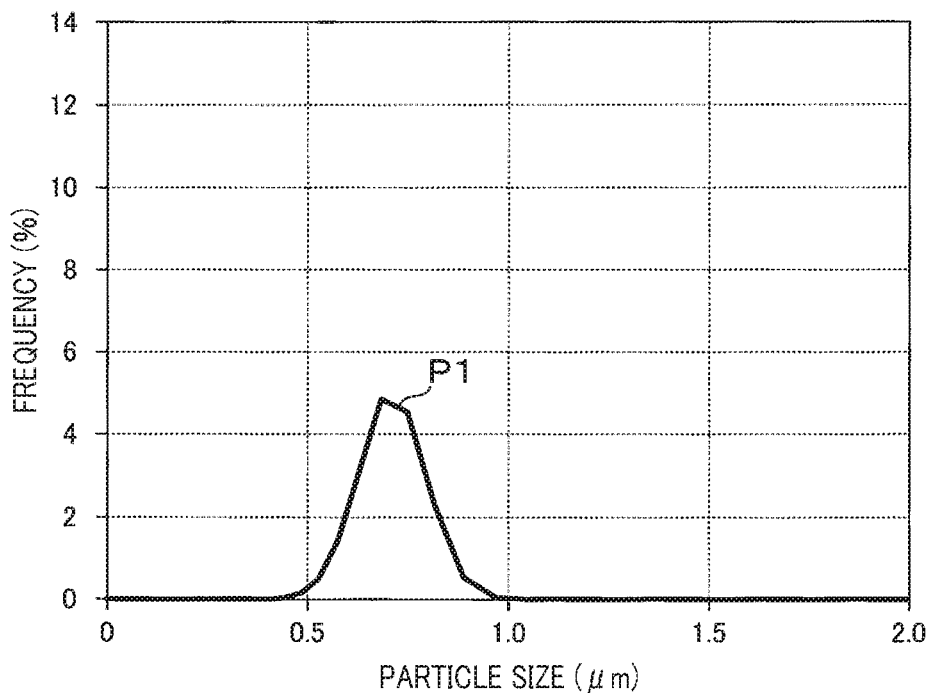
FIG. 6 is a particle-size distribution diagram of the stabilizer low-concentration phase particles on a large particle size side, according to the first embodiment.

As shown in examples in FIG. 5 and FIG. 6, in the partially stabilized zirconia 2 according to the present embodiment, the low-concentration phase particle 33 has a predetermined peak P1 in a particle-size distribution thereof. The particle-size distribution of the low-concentration phase particle 33 is a number distribution. The peak P1 is a peak at which an average particle size is 0.6 to 1.0 μm, and the particle size at 10% of the cumulative number is 0.5 μm or greater. This peak is referred to as a first peak P1. The peak can also be considered to be a particle group. Therefore, the first peak P1 can also be considered to be a first low-concentration phase particle group. The particle size at 10% of the cumulative number is referred to as "D10 particle size", as appropriate. The D10 particle size is that of the particles that belong to the first peak. Here, FIG. 5, FIG. 6, and FIG. 7, described hereafter, are examples of the particle-size distribution of the low-concentration phase particles 33.

Although the particle-size distribution of the low-concentration phase particles 33 will be described hereafter in the experimental example, first, a plurality of low-concentration phase particles 33 are selected from a crystal structure of the solid electrolyte 1. Next, the particle-size distribution of actual measurement values is acquired by the particle sizes of the low-concentration phase particles 33 being measured. Furthermore, a particle-size distribution that is acquired by the particle-size distribution of the actual measurement values being approximated by a Gaussian function is the particle-size distribution of the low-concentration phase particles 33.

A dotted line in FIG. 5 is the particle-size distribution of the actual measurement values, and a solid line is the particle-size distribution after approximation. As shown in the example in FIG. 4, the particle size of the low-concentration phase particle 33 is expressed by an arithmetical mean of a length L1 in the horizontal direction and a length L2 in the vertical direction of a rectangle in which the particle is surrounded by the maximum widths of the particle in the horizontal direction and the vertical direction.

From a perspective of thermodynamics, the low-concentration phase particle 33 can be considered to be the M-phase. In addition, the coefficients of thermal expansion of crystal phases (such as the C-phase and the T-phase) other than the M-phase are substantially identical. Therefore, should the percentage of the low-concentration phase particles 33 be prescribed, the coefficient of thermal expansion as the solid electrolyte 1 is substantially determined.

In the above-described particle-size distribution, as a result of the low-concentration phase particle 33 such as that having the first peak P1 being present, the difference in coefficient of thermal expansion and hysteresis between the solid electrolyte 1 and the dissimilar material member 4, such as alumina or spinel, can be reduced. In addition, thermal expansion behaviors of the C-phase and the T-phase during temperature increase and temperature decrease are substantially linear and hysteresis is hardly present.

For example, the solid electrolyte 1 can be used such as to be placed in contact with the dissimilar material member 4 that is made of alumina, spinel, or the like. For example, during the cooling/heating cycle in which the solid electrolyte 1 that is configured as described above is exposed to a high-temperature region that exceeds 1,000° C., the coefficient of thermal expansion can be matched with that of the dissimilar material member 4 up to the high-temperature region. Therefore, thermal shock breakage can be sufficiently prevented even in uses in which the solid electrolyte 1 is exposed to a high-temperature region.

Figure 7:
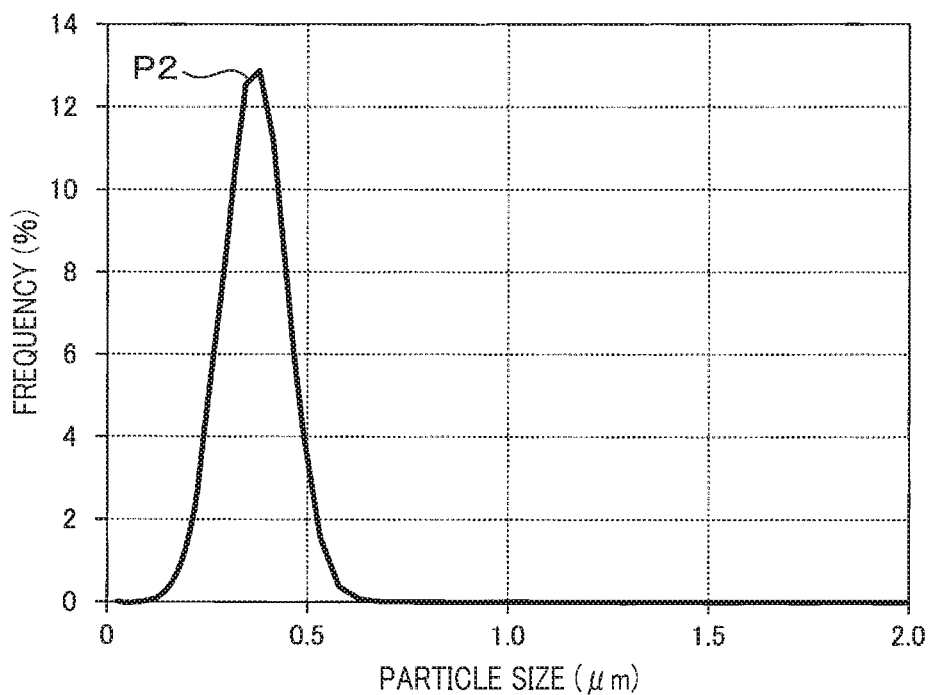
FIG. 7 is a particle-size distribution diagram of the stabilizer low-concentration phase particles on a small particle size side, according to the first embodiment.
Figure 8:
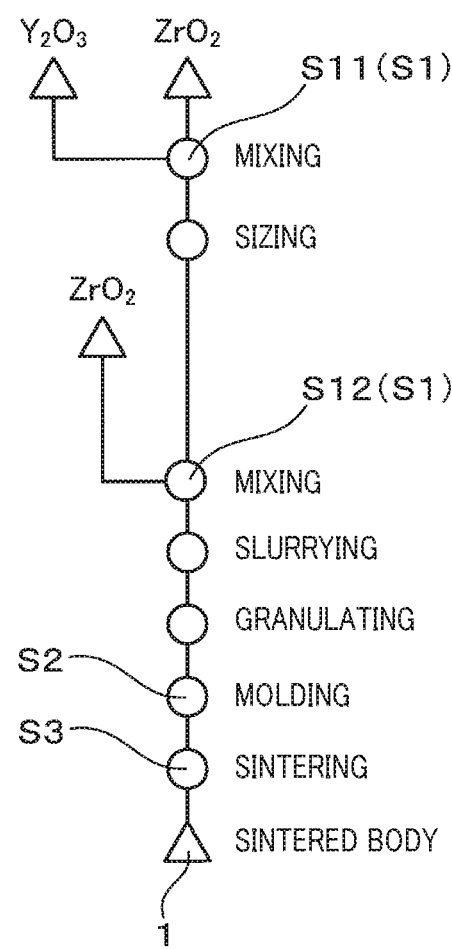
FIG. 8 is an explanatory diagram of a manufacturing method of the solid electrolyte according to the first embodiment.
Figure 9:
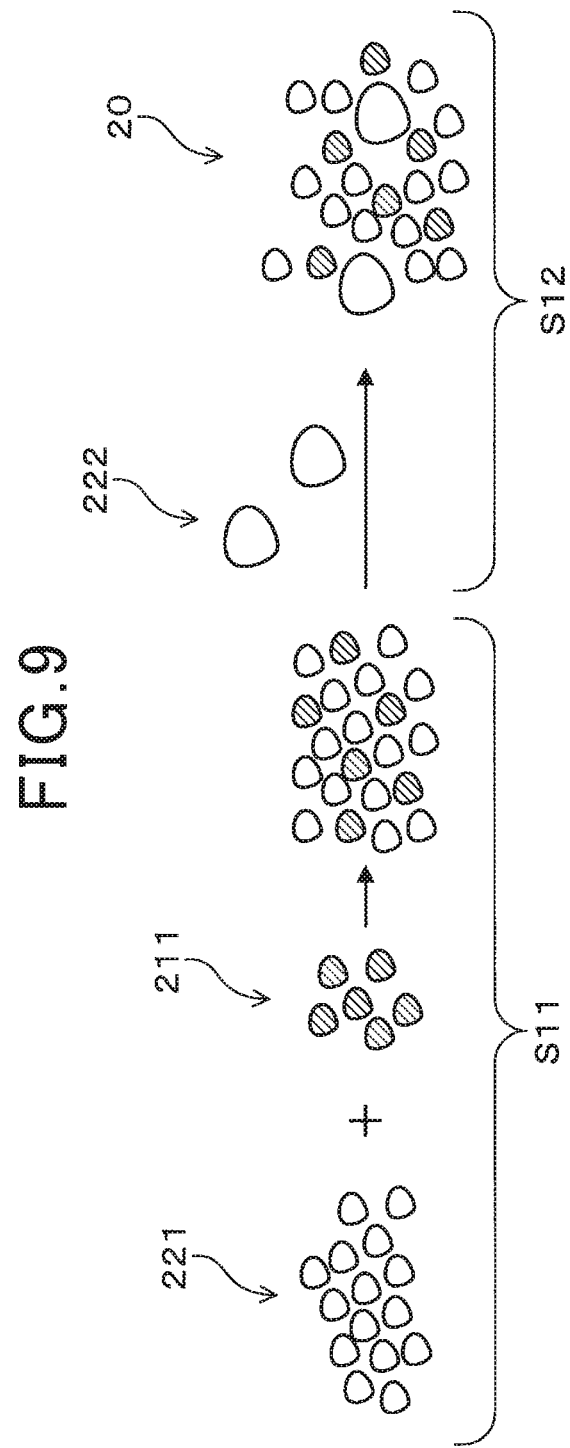
FIG. 9 is an explanatory diagram of a mixing step for raw materials according to the first embodiment.

As shown in the examples in FIG. 5 and FIG. 7, the low-concentration phase particles 33 preferably further has a second peak P2 in the particle-size distribution of the number frequency. The second peak P2 is a peak at which the average particle size is 0.2 to 0.4 μm, and the particle size at 90% of the cumulative number is 0.5 μm or less. The second peak P2 can also be considered to be a second low-concentration phase particle group. The particle size at 90% of the cumulative number is referred to as "D90 particle size", as appropriate. The D90 particle size is that of the particles that belong to the second peak P2. When the second peak P2 is present, the strength of the solid electrolyte 1 improves. Therefore, mechanical fractures and damage in the solid electrolyte 1 can be further prevented.

The first peak P1 and the second peak P2 are respectively a peak on the large particle size side and a peak on the small particle size side in the particle-size distribution. When both the first peak P1 and the second peak P2 are present, hysteresis can be reduced while mechanical strength is maintained.

Of the overall low-concentration phase particles 33, 20 to 50% by volume preferably belongs to the second peak. In this case, improvement in strength and reduction in the difference in coefficient of thermal expansion can both be achieved at high levels.

Here, the average particle size of the first peak P1 is greater than the average particle size of the M-phase in a comparison example 1, described hereafter. Meanwhile, the average particle size of the second peak P2 is substantially the same as the average particle size of the M phase in the comparison example 1.

From the perspective of achieving the effects of the present disclosure, the type of the stabilizer 21 is not particular limited. However, from the perspective of making chemical stability of the stabilizer favorable, the stabilizer 21 is preferably made of yttria.

The solid electrolyte 1 preferably has a contacting portion 1A that is configured to come into contact with the dissimilar material member 4. In this case, the effect of peeling and cracks occurring between the dissimilar material member 4 and the solid electrolyte 1 can be more precisely obtained.

Here, the dissimilar material member 4 is a member that is made of a material that differs from that of the solid electrolyte 1. The contacting portion 1A is merely required to be a portion that is at least partially in contact. For example, a contact surface is also included in the contacting portion 1A. The solid electrolyte 1 that includes the contacting portion 1A means that the solid electrolyte 1 is used such as to be in contact with the dissimilar material member 4 and has a constituent portion that is placed in contact with the dissimilar material member 4. Actual contact with the dissimilar material member 4 is not necessarily required. In addition, for example, the solid electrolyte 1 can be used in a gas sensor and be provided with a gas contacting portion that is configured to come into contact with a measurement gas, such as exhaust gas.

Next, a manufacturing method of the solid electrolyte 1 will be described. As shown in examples in FIG. 8 and FIG. 9, the solid electrolyte 1 is obtained by a mixing step S1, a molding step S2, and a sintering step S3 being performed.

At the mixing step S1, a first raw material powder 221, a second raw material powder 222, and a stabilizer raw material powder 211 are mixed. As a result, a mixture 20 is obtained. The first raw material powder 211 and the second raw material powder 222 are both made of zirconia. The stabilizer raw material powder is made of yttria or the like. The second raw material powder 222 is a powder of which the average particle size is greater than that of the first raw material powder 221.

As the stabilizer raw material powder 211, yttria powder, calcia powder, magnesia powder, scandia powder, ytterbia powder, or the like can be used. As the stabilizer raw material powder 211, at least one type among the foregoing can be used.

For example, the second raw material powder 222 can be fabricated by a raw material powder that has a small particle size in a manner similar to the first raw material powder 221 being subjected to heat treatment. Particle growth occurs as a result of the heat treatment. As a result, the second raw material powder 222 that is made of a powder that has a greater average particle size than the first raw material powder 221 can be obtained. Commercially available products can be respectively used as the first raw material powder 221 and the second raw material powder 222.

The average particle sizes of the first raw material powder 221 and the second raw material powder 222 refer to the particle size at a volume integration of 50% in the particle size distribution that is determined by a laser diffraction/scattering method. The particle size at a volume integration of 50% in the particle size distribution that is determined by a laser diffraction/scattering method is referred to as "d50 particle size", as appropriate.

For example, the d50 particle size of the first raw material powder 221 can be within a range of 0.2 to 0.5 μm. Meanwhile, for example, the d50 particle size of the second raw material powder 222 can be within a range of 0.6 to 1.0 μm. The average particle size of the second raw material powder is preferably equal to or greater than 0.5 μm. In this case, formation of the low-concentration phase particles can be further promoted. The d50 particle sizes of the first raw material powder 221 and the second raw material powder 222 are primary particle sizes.

The mixing step S1 preferably further includes a first mixing step S11 and a second mixing step S12. At the first mixing step S11, the first raw material powder 221 and the stabilizer raw material powder 211 are mixed. At the second mixing step S12, after the first mixing step S11, the second raw material powder 222 is further mixed with the mixture of the first raw material powder 221 and the stabilizer raw material powder 211, and a mixture is obtained.

The mixture can be made into a slurry before molding. To make the mixture into a slurry, a liquid such as water, alcohol, or a liquid organic substance can be used. A water-based liquid is preferably used. The mixture that is made into a slurry may be granulated.

Next, the molding step S2 is performed. At the molding step S2, the mixture that contains the first raw material powder 221, the second raw material powder 222, and the stabilizer raw material powder 211 is molded. As a result, a molded body is obtained.

The molding method is not particularly limited. Compacting, pressure molding, extrusion molding, injection molding, hot press, cold isotropic pressure molding, grinding, and the like can be given. As a result of molding, a molded body of a desired shape based on intended use can be obtained. For example, molded bodies of various shapes such as a board shape, a sheet shape, a hollow sheet shape, a rod shape, a cylindrical shape, and a bottomed cylindrical shape can be obtained. Grinding can be performed on the molded body as required.

Next, at the sintering step S3, the molded body is sintered. As a result of the sintering, the partially stabilized zirconia 2 is produced and the solid electrolyte 1 is obtained. Sintering temperature can be changed as appropriate based on composition, but is, for example, 1,300° C. to 1,500° C.

In the above-described manufacturing method, the second raw material powder 222 that is made of large-size particles that do not easily react with the stabilizer 21 is used as a portion of the zirconia raw material. As a result, the above-described low-concentration phase particles 33 are formed at the sintering step S3. In this manner, the solid electrolyte 1 according to the present embodiment can be obtained.

The solid electrolyte 1 according to the present embodiment is made of the partially stabilized zirconia 2 in which the stabilizer 21 forms a solid solution in zirconia 22. The partially stabilized zirconia 2 includes at least the M-phase particles 21 and the C-phase particles 32 as the crystal particles 3 that configure the partially stabilized zirconia 2. The abundance ratio of the M-phase particles 31 is 5 to 25% by volume.

Meanwhile, the partially stabilized zirconia 2 contains the low-concentration phase particles 33 of which the concentration of the stabilizer 21 at the particle center O is equal to or less than 1 mol %, as the crystal particles 3. In addition, the low-concentration phase particle 33 as at least the peak P1 at which the average particle size is 0.6 to 1.0 μm and the particle size at 10% of the cumulative number is 0.5 μm or greater in the particle-size distribution of the number frequency. Of the overall low-concentration phase particles 33, 50% by volume or greater belong to the peak P1.

Because the solid electrolyte 1 is configured in this manner, for example, even when the solid electrolyte 1 is exposed to a high-temperature region, hysteresis is small and strength is high. A reason for this is thought to be that the crystal phase of the low-concentration phase particle 33 can be present as a stable phase up to a high-temperature region that exceeds 1,000° C.

<Comparison Example 1>

Next, a solid electrolyte of a comparison example will be described. A solid electrolyte 9 of the comparison example 1 is manufactured by a method that is similar to that according to the first embodiment, other than the second raw material powder not being used.

Specifically, the first raw material power 221 and the stabilizer raw material powder are mixed. Next, the mixture is made into a slurry, molded, and sintered. The solid electrolyte 9 of the present example can be obtained in this manner.

Figure 10:
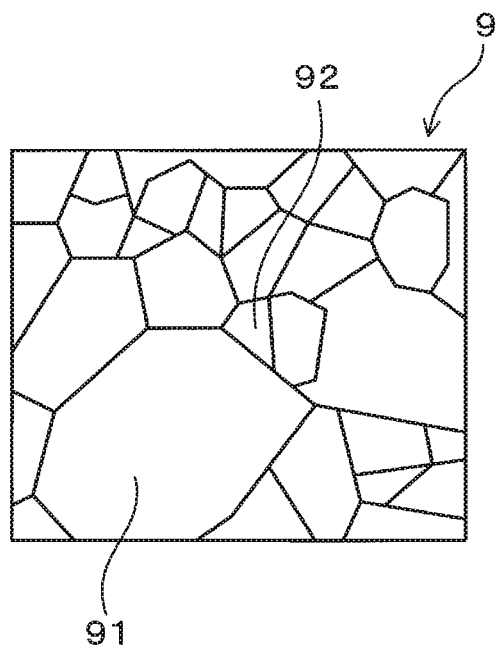
FIG. 10 is a schematic diagram of a microstructure of partially stabilized zirconia configuring a solid electrolyte in a comparison example 1.

As shown in an example in FIG. 10, partially stabilized zirconia 90 that configures the solid electrolyte 9 of the present example contains C-phase particles 91 and M-phase particles 92 as the crystal particles. The M-phase particles 92 are sufficiently smaller than the C-phase particles 91. The average particle size of the M-phase particles 92 in the present example is about 0.4 μm. This is merely about the size of the low-concentration phase particles belonging to the second peak according to the first embodiment.

In the present example, the second raw material powder that has a large average particle size is not used. Therefore, reactivity between the first raw material powder 221 and the stabilizer is high. As a result, although a solid solution state is omitted in the drawings, the stabilizer forms a solid solution into the interior of the M-phase particles 92 as well, in addition to the C-phase particles 91. This can be confirmed by SEM/EDX.

That is, the solid electrolyte 9 of the present example does not have the low-concentration phase particles. Alternatively, even should the solid electrolyte 9 have the low-concentration phase particles, the low-concentration phase particles that belong to the first peak like that according to the first embodiment are not present or are fewer. As a result, in the solid electrolyte 9 of the present example, the M-phase particles 92 become an unstable crystal phase at a high-temperature region, and hysteresis increases.

Therefore, for example, during a temperature decrease process of the cooling/heating cycle, the coefficient of thermal expansion of the solid electrolyte 9 tends to significantly diverge from that of the dissimilar material member 4. As a result, for example, when the solid electrolyte 9 is used such as to be in contact with a dissimilar material member that is made of alumina, spinel ($MgAl_2O_4$), or the like, the difference in coefficient of thermal expansion between the solid electrolyte 9 and the dissimilar material member becomes large.

Peeling and cracking between the solid electrolyte 9 and the dissimilar material member may occur. In particular, for example, during the cooling/heating cycle in which the solid electrolyte 9 is exposed to a high-temperature region that exceeds 1,000° C., the divergence of the difference in coefficient of thermal expansion increases, and peeling and cracking more easily occurs.

<Experimental Examples>

A plurality of solid electrolytes of an experimental example and a comparison example are fabricated, and performances thereof are compared and evaluated. A fabrication method of the solid electrolyte of the present example will be described below.

First, a zirconia powder of which the d50 particle size is 0.30 μm and yttria powder were mixed and sized. In addition, a zirconia powder of which the d50 particle size is 0.70 μm was mixed. A mixture was obtained in this manner. The zirconia powder of which the d50 particle size is smaller corresponds to the above-described first raw material powder and the zirconia powder of which the d50 particle size is larger corresponds to the above-described second raw material powder. The yttria powder corresponds to the above-described stabilizer raw material powder. A mixing ratio thereof can be adjusted based on a target composition.

Next, the mixture and water were mixed, and a slurry of the mixture was obtained. To increase fluidity of the raw material particles that compose the mixture and facilitate molding into a desired shape, granulation of the slurry of the mixture was performed. For example, granulation is performed by spray granulation.

Next, the mixture was molded, and a molded body was obtained. For example, molding is performed by compacting. In the present example, the mixture was molded into a sample shape that is used in the evaluations described hereafter.

Next, the molded body was sintered at a temperature of 1,400° C. The solid electrolyte was obtained in this manner. In the present example, the solid electrolytes of samples 1 to 23, shown in Table 1, were fabricated by the average particle sizes of the raw materials, blending ratios, and the like being changed.

(Crystal Phase Ratio)

As a crystal phase ratio, an M-phase ratio and a T-phase ratio were measured in a following manner. First, a measurement sample that has a width of 5 mm, a length of 20 mm, and a thickness of 2 mm was cut from each sample. The crystal phase ratio on the surface of the measurement sample was measured by an X-ray diffraction apparatus (that is, by XRD).

An M-phase ratio m is calculated by expression (1), below, based on a sum I1 of peak intensities of the Miller index (111) of the C-phase and the Miller index (111) of the T-phase and a sum I2 of peak intensities of the Miller indices (11-1) and (111) of the M-phase. The measurement was performed five times for each measurement sample.

Average values thereof are shown in Table 1. Here, "-" in the Miller index of the M-phase is originally that which is attached above the 1 to the right of "-". However, for convenience of creating the specification, "-" is added to the left of the 1, as described above. In addition, a T-phase ratio t is calculated by expression (2), below, based on a peak intensity I3 of the Miller index (400) of the C-phase and a sum I4 of peak intensities of the Miller indices (400) and (004) of the T-phase.

$$m=100\times I2/(I1+I2) \quad (1)$$

$$t=100\times I4/(I3+I4) \quad (2)$$

(Observation of Low-Concentration Phase Particles)

A measurement sample that has a width of 5 mm, a length of 20 mm, and a thickness of 2 mm was cut from each sample. After the surface of the measurement sample was ground, a thermal etching process was performed. Thermal etching was performed by the measurement sample being heated for 1 hour at a temperature of 1,200° C. Mapping of Y-elements was performed at five areas through composition analysis by SEM/EDX analysis. Regarding particles of which the Y-concentration is small among the observed particles, the Y-concentration at the particle center O was measured. As a result, the particles were particles of which the Y-concentration at the particle center O is equal to or less than a detection limit, that is, equal to or less than 1%.

Observation conditions for SEM are as follows: apparatus: "SU8220" manufactured by Hitachi High-Technologies Corporation; acceleration voltage: 5 kV; WD setting: 8.0 mm; current: 10 mA; magnification: 20,000 times. In addition, measurement conditions for EDX are as follows: apparatus: "Xflash 6160" manufactured by Bruker Corporation; acceleration voltage: 5 kV; WD setting: 14 mm; current: 5 to 15 mA; magnification: 50,000 times. The current was adjusted such that a detection amount is 40 to 55 kcps.

Next, 150 low-concentration phase particles were selected from the above-described five areas, and the particle sizes thereof were measured. As shown in the example in FIG. 4, the particle size of the low-concentration phase particle is expressed by an arithmetical mean of the length L1 in the horizontal direction and the length L2 in the vertical direction of a rectangle in which the particle is surrounded by the maximum widths of the particle in the horizontal direction and the vertical direction.

Next, as shown in the examples in FIG. 5 to FIG. 7, the particle-size distribution of the low-concentration phase particles was generated for each sample. The particle-size distribution is obtained by the particle-size distribution of the actual measurement values being fitted by a Gaussian function. Here, a to d of the Gaussian function shown in expression (3), below, are determined by the least squares method.

$$f(x)=a+b\times\exp\{-(x-c)2/d2\} \quad (3)$$

The D10 particle size and the D90 particle size are calculated from this particle-size distribution. In addition, the particle size at a peak top of each peak was set as the average particle size of each peak. Here, the peak on the large-size side in the particle-size distribution is a peak A and the peak on the small particle size side is a peak B. When a peak at which the average particle size is within a range of 0.6 to 1 μm and the D10 particle size is equal to or greater than 0.5 μm is present in the particle size distribution, the first peak is determined to be present. Furthermore, regarding samples 17 to 23, when a peak at which the average particle size is 0.2 to 0.4 μm and the D90 particle size is equal to or less than 0.5 μm is present, the second peak is determined to be present.

Next, volume percentages of the low-concentration phase particles belonging to the first peak and the second peak, that is, a first peak percentage and a second peak percentage were measured. The volume of each low-concentration phase particle is calculated by the particle size being cubed.

(Coefficient of Thermal Expansion and Thermal Expansion Hysteresis)

A measurement sample that has a width of 5 mm, a length of 20 mm, and a thickness of 1 mm was cut from each sample. Thermal expansion behavior between room temperature and 1,050° C. was measured for the measurement samples. The room temperature is 25° C. A thermomechanical analyzer (that is, TMA) was used for measurement of the thermal expansion behavior. As the TMA, TMA 4000SA manufactured by Bruker AXS Corporation was used. An alumina sintered body was used in a reference sample used for measurement.

Here, measurement was performed five times for each sample. In addition, regarding the thermal expansion behavior that indicates a relationship between temperature and elongation rate, a slope from 500° C. to 600° C. is the coefficient of thermal expansion. Furthermore, a maximum difference in elongation rate between temperature increase and temperature decrease is defined as the magnitude of hysteresis.

Table 1 shows the average value of the measurements performed five times. A determination criterion is that, from the perspective of matching the coefficient of thermal expansion with that of the dissimilar material, the sample is determined to be acceptable when the coefficient of thermal expansion is 8 to 9 ppm/° C. and not acceptable when the coefficient of thermal expansion falls outside 8 to 9 ppm/° C. Moreover, from the perspective of suppressing cracks in the solid electrolyte, the sample is determined to be acceptable when the magnitude of hysteresis is equal to or less than 0.10% and not acceptable when the magnitude of hysteresis exceeds 0.10%. Here, the magnitude of hysteresis is preferably equal to or less than 0.10% and more preferably equal to or less than 0.05%.

(Strength)

A measurement sample that has a width of 5 mm, a length of 45 mm, and a thickness of 5 mm was cut. A strength evaluation sample was fabricated from the measurement sample based on a four-point flexural strength test described in JIS R1601:2008. Next, the four-point flexural strength test based on JIS R1601:2008 was performed. The result thereof is the strength. Here, the test was performed ten times for each sample.

The table shows an average value of the tests. The strength was determined to be acceptable at 250 MPa or greater, and not acceptable at less than 250 MPa. When the strength is less than 250 MPa, for example, cracks may occur when the solid electrolyte is assembled to a sensor or the like. That is, from the perspective of ensuring strength in assembly inside an apparatus, the strength of the solid electrolyte is preferably equal to or greater than 250 MPa and more preferably equal to or greater than 350 MPa.

TABLE 1

| Sample No. | M-phase percentage | Y low concentration phase particle percentage | Peak A Average particle size [μm] | Peak A D10 particle size [μm] | Peak A Presence of first peak | Peak A Peak percentage [% by volume] | Peak B Average particle size [μm] |
|---|---|---|---|---|---|---|---|
| 1 | 15% | None | 0.4 | 0.31 | None | 61% | — |
| 2 | 14% | Present | 0.6 | 0.52 | Present | 53% | — |
| 3 | 5% | Present | 0.7 | 0.51 | Present | 64% | — |
| 4 | 11% | Present | 0.7 | 0.55 | Present | 62% | — |
| 5 | 19% | Present | 0.8 | 0.61 | Present | 71% | — |
| 6 | 25% | Present | 0.7 | 0.54 | Present | 65% | — |
| 7 | 3% | Present | 0.8 | 0.69 | Present | 53% | — |
| 8 | 29% | Present | 0.8 | 0.58 | Present | 71% | — |
| 9 | 15% | Present | 0.5 | 0.32 | None | 75% | — |
| 10 | 16% | Present | 0.6 | 0.48 | Present | 64% | — |
| 11 | 15% | Present | 0.8 | 0.68 | Present | 53% | — |
| 12 | 17% | Present | 1.0 | 0.71 | Present | 61% | — |
| 13 | 16% | Present | 1.1 | 0.75 | None | 62% | — |
| 14 | 14% | Present | 0.8 | 0.65 | Present | 42% | — |
| 15 | 13% | Present | 0.8 | 0.61 | Present | 85% | — |
| 16 | 16% | Present | 0.8 | 0.66 | Present | 98% | — |
| 17 | 14% | Present | 0.8 | 0.65 | Present | 81% | 0.16 |
| 18 | 15% | Present | 0.8 | 0.63 | Present | 82% | 0.2 |
| 19 | 14% | Present | 0.8 | 0.62 | Present | 81% | 0.32 |
| 20 | 16% | Present | 0.8 | 0.66 | Present | 79% | 0.44 |
| 21 | 15% | Present | 0.8 | 0.65 | Present | 80% | 0.53 |
| 22 | 18% | Present | 0.8 | 0.59 | Present | 66% | 0.34 |
| 23 | 17% | Present | 0.8 | 0.61 | Present | 50% | 0.32 |

| Sample No. | Peak B D90 particle size [μm] | Peak B Presence of second peak | Peak B Second peak percentage [% by volume] | Coefficient of thermal expansion [ppm/° C.] | Magnitude of hysteresis [%] | Strength [MPa] | Determination |
|---|---|---|---|---|---|---|---|
| 1 | — | — | — | 0.47 | 0.18 | 350 | Not good |
| 2 | — | — | — | 0.44 | 0.09 | 300 | Good |
| 3 | — | — | — | 9 | 0.05 | 290 | Good |
| 4 | — | — | — | 8.86 | 0.07 | 300 | Good |
| 5 | — | — | — | 8.33 | 0.08 | 280 | Good |
| 6 | — | — | — | 8.03 | 0.09 | 270 | Good |
| 7 | — | — | — | 9.24 | 0.04 | 310 | Not good |
| 8 | — | — | — | 7.89 | 0.09 | 260 | Not good |
| 9 | — | — | — | 8.46 | 0.11 | 330 | Not good |
| 10 | — | — | — | 8.64 | 0.08 | 310 | Good |
| 11 | — | — | — | 8.55 | 0.05 | 290 | Good |
| 12 | — | — | — | 8.39 | 0.03 | 250 | Good |
| 13 | — | — | — | 8.47 | 0.03 | 230 | Not good |
| 14 | — | — | — | 8.49 | 0.11 | 300 | Not good |
| 15 | — | — | — | 8.45 | 0.06 | 300 | Good |

TABLE 1-continued

| | | | | | | | |
|---|---|---|---|---|---|---|---|
| 16 | — | — | — | 8.52 | 0.02 | 310 | Good |
| 17 | 0.37 | None | 19% | 8.51 | 0.10 | 350 | Good |
| 18 | 0.45 | Present | 18% | 8.52 | 0.08 | 350 | Good |
| 19 | 0.48 | Present | 19% | 8.56 | 0.04 | 350 | Excellent |
| 20 | 0.56 | None | 21% | 8.62 | 0.05 | 330 | Good |
| 21 | 0.61 | None | 20% | 8.57 | 0.06 | 320 | Good |
| 22 | 0.46 | Present | 34% | 8.31 | 0.05 | 360 | Excellent |
| 23 | 0.44 | Present | 50% | 8.38 | 0.08 | 370 | Good |

As is clear from Table 1, sample 1 that does not contain the low-concentration phase particles as the crystal particles has large hysteresis. In a manner similar to the comparison example 1, sample 1 is a solid electrolyte that is fabricated using a zirconia powder that has a single type of average particle size as the zirconia powder.

Samples 2 to 23 are solid electrolytes that have the low-concentration phase particles. In samples 2 to 23, the T-phase percentage is 0.1 to 60% by volume. In samples 2 to 8, characteristics are favorable from the perspective of the coefficient of thermal expansion, the magnitude of hysteresis, and strength. In sample 7 and sample 8 of which the M-phase percentages fall outside the range of 5 to 25% by volume, the coefficients of thermal expansion fall outside the desired range.

In addition, as is clear from comparisons of samples 9 to 13, in samples 10 to 12 of which the average particle size and the D10 particle size are within predetermined ranges, hysteresis decreases. In particular, hysteresis is smallest in sample 13 of which the average particle size at the first peak is large. Sample 13 is the most favorable from the perspective of hysteresis. Although hysteresis decreases when the average particle size increases, in sample 13 of which the average particle size is excessively large, strength decreases. In addition, in sample 9 of which the average particle size at the first peak is excessively small, hysteresis is large.

As is clear from comparisons of samples 14 to 16, in sample 14 in which the volume percentage of the low-concentration phase particles that belong to the first peak falls below 50%, hysteresis is large. A reason for this is thought to be that, when the low-concentration phase particles are few, the effect of reduction in hysteresis as a result of the low-concentration phase particles being present cannot be sufficiently achieved. When the volume percentage of the low-concentration phase particles belonging to the first peak become equal to or greater than 50%, hysteresis can be reduced.

Samples 17 to 23 show cases in which the second peak is present. In this case, cracks are dispersed by particle boundaries of the relatively fine low-concentration phase particles belonging to the second peak. As a result, the strength of the solid electrolyte increases. When samples 17 to 23 are compared, hysteresis is slightly larger in sample 17. A reason for this is thought to be that the particle size at the second peak is small and solid solution of Y is difficult to prevent during sintering. Sample 19 and sample 22 of which hysteresis and strength are both favorable were determined to be "excellent".

Second Embodiment

Next, an embodiment of a gas sensor 5 that uses a solid electrolyte will be described. Here, among reference numbers used according to the second and subsequent embodiments, reference numbers that are identical to those used according to a previous embodiment indicate constituent elements and the like that are similar to those according to the previous embodiment unless particularly stated otherwise.

Figure 11:
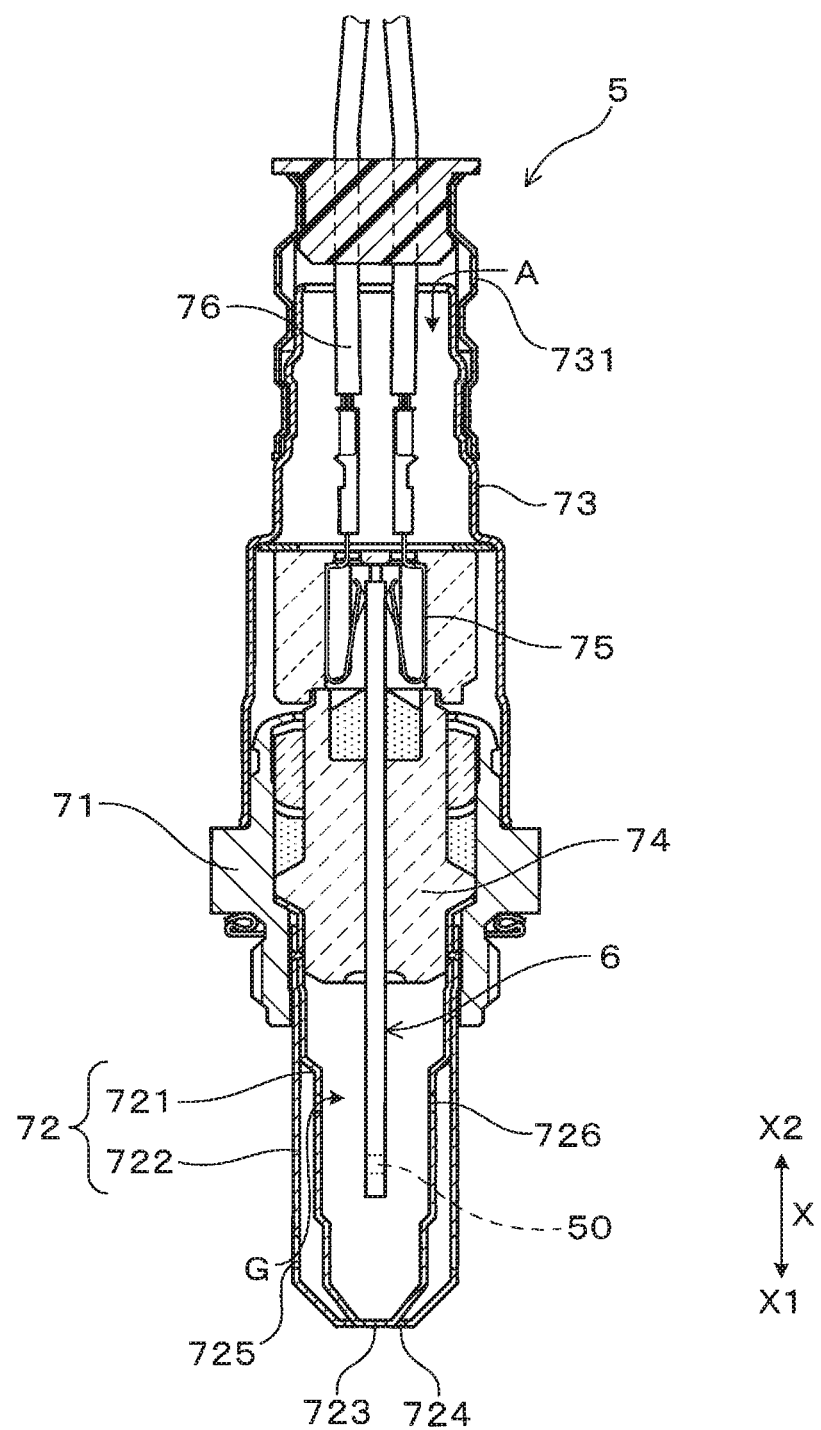
FIG. 11 is a cross-sectional view of a gas sensor according to a second embodiment.
Figure 12:
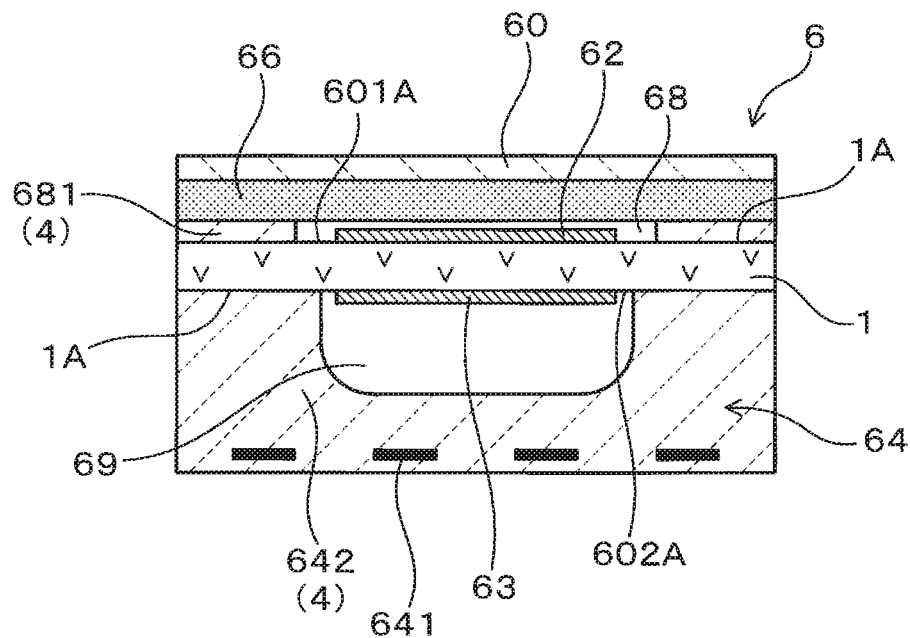
FIG. 12 is a cross-sectional view of a laminated-type gas sensor element according to the second embodiment.

As shown in FIG. 11 and FIG. 12, the gas sensor 5 according to the present embodiment includes a sensor element 6. The sensor element 6 according to the present embodiment is a gas sensor element that detects gas. The sensor element 6 includes the solid electrolyte 1, a detection electrode 62, a reference electrode 63, and a diffusion resistance layer 66. That is, the gas sensor 5 includes the solid electrolyte 1 inside the sensor element 5.

The detection electrode 62 and the reference electrode 63 are respectively formed on both surfaces 601A and 602A of the solid electrolyte 1. The detection electrode 62 and the reference electrode 63 form a pair of electrodes that are formed in positions that oppose each other. The diffusion resistance layer 66 restricts a flow amount of measured gas, such as exhaust gas G, that reaches the detection electrode 62. The gas sensor 5 is a limiting-current type that detects oxygen concentration (that is, air-fuel ratio) in the exhaust gas G based on a magnitude of a limiting current that is generated between the pair of electrodes 62 and 63 in a state in which a voltage is applied across the pair of electrodes 62 and 63.

The gas sensor 5 according to the present embodiment will be described in detail below. Here, in the description below, a side in an axial direction X of the gas sensor 5 that is exposed to the measured gas, such as the exhaust gas G, is referred to as a distal-end side X1, and a side opposite thereof is referred to as a proximal-end side X2.

(Gas Sensor)

The gas sensor 5 is used such as to be arranged in an exhaust pipe of an internal combustion engine of a vehicle or the like. As according to the present embodiment, the limiting-current-type gas sensor 5 is used as an air-fuel ratio sensor that quantitatively detects the air-fuel ratio of the exhaust gas G that flows through the exhaust pipe. The gas sensor 5 can quantitatively determine the air-fuel ratio both in a case in which the air-fuel ratio is on a rich side and a case in which the air-fuel ratio is on a lean side.

Here, the air-fuel ratio of the exhaust gas G refers to a mixture ratio of fuel and air during combustion in the internal combustion engine. In addition, the rich side refers to when the air-fuel ratio of the exhaust gas G is such that the fuel is on the greater side, compared to a theoretical air-fuel ratio when the fuel and the air completely combust. The lean side refers to the air-fuel ratio being that in which the fuel is on the less side compared to the theoretical air-fuel ratio.

In the gas sensor 5 according to the present embodiment, as a result of the oxygen concentration in the exhaust gas being detected, the air-fuel ratio of the exhaust gas is detected. The gas sensor 5 that serves as the air-fuel ratio sensor essentially detects the oxygen concentration in the exhaust gas G on the lean side, and on the other hand, detects unburned gas concentration in the exhaust gas G on the rich side.

As shown in FIG. 11, the gas sensor 5 includes a housing 71, a distal-end-side cover 72, a proximal-end-side cover 73, and the like, in addition to the sensor element 6. The housing 71 is attached to the exhaust pipe and holds the sensor element 6 via an insulator 74. The distal-end-side cover 72 is attached to the distal-end side X1 of the housing 71 and covers the sensor element 6. The distal-end-side cover 72 has a double-layer structure and is made of an inner cover 721 and an outer cover 722. The proximal-end-side cover 73 is attached to the proximal-end side of the housing 71 and covers a terminal 75 for electric wiring and the like of the sensor element 6.

(Sensor Element)

As shown in an example in FIG. 12, for example, a lamination-type sensor element is used as the sensor element 6. That is, the sensor element 6 can be configured by a lamination body in which the reference electrode 63, the plate-shaped solid electrolyte 1, and the detection electrode 62 are successively laminated.

As shown in the example in FIG. 12, the sensor element 6 includes the plate-shaped solid electrolyte 1. The solid electrolyte 1 has a measured gas surface 601A and a reference gas surface 602A. The measured gas surface 601A is a surface that is exposed to the measured gas, such as the exhaust gas G Meanwhile, the reference gas surface 602A is a surface that is exposed to reference gas, such as atmospheric air A. The measured gas surface 601A and the reference gas surface 602A are surfaces of the solid electrolyte 1 that are opposite each other.

The detection electrode 62 is provided on the measured gas surface 601A of the solid electrolyte 1. Meanwhile, the reference electrode 63 is provided on the reference gas surface 602A. When the sensor element 6 is configured by the lamination-type sensor element such as this, a heat generating member 641 that configures a heater 64 is laminated onto the solid electrolyte 1 via an insulator 642. For example, the insulator 642 is made of alumina.

The detection electrode 62 faces a measured gas chamber 68. The measured gas that has passed through the porous diffusion resistance layer 66 is introduced into the measured gas chamber 68. The measured gas chamber 68 is a space that is surrounded by the solid electrolyte 1, a measured gas chamber formation layer 681, and the diffusion resistance layer 66.

The detection electrode 62 is formed such as to be in contact with the solid electrolyte 1. Furthermore, the measured gas chamber formation layer 681 that is a structural component of the measured gas chamber 68 is formed such as to be in contact with the solid electrolyte 1. The detection electrode 62 is exposed to the measured gas, such as the exhaust gas G, and is a portion that performs gas detection together with the reference electrode 63. The detection electrode 62 is electrically connected to the terminal 75 to which a lead wire 76 is connected.

The reference electrode 63 faces a reference gas chamber 69. The reference gas, such as the atmospheric air A, is introduced into the reference gas chamber 69 from the proximal-end side X2 through a passage hole 731 in the proximal-end-side cover 73. Here, as the sensor element 6, a cup-type sensor element described hereafter can also be used instead of the lamination-type sensor element.

The detection electrode 62 is exposed to the measured gas, such as the exhaust gas G, that flows into the distal-end-side cover 42 through passage holes 723, 724, and 725 that are provided in the distal-end-side cover 72. The reference electrode 63 is exposed to the reference gas, such as the atmospheric air A, that flows through the passage hole 731 provided in the proximal-end-side cover 73 and into the reference gas chamber 69 of the solid electrolyte 1 from inside the proximal-end-side cover 73.

The heater 64 generates heat by energization. The heater 64 heats the solid electrolyte 1 and the electrodes 62 and 63 to an activation temperature during startup of the internal combustion engine and the gas sensor 5, or the like. The heater 64 is configured by the insulator 642 that is made of an alumina sintered body, and the heat generating body 641 that is formed inside the heater 64. The alumina sintered body that composes the insulator 642 is in contact with the solid electrolyte.

In other words, the sensor element 6 is a structural body in which the solid electrolyte 1 and the dissimilar material member 4 made of the alumina sintered body are in contact. The solid electrolyte 1 has the contacting portion 1A (specifically, a contacting surface) with the dissimilar material member 4 that is made of alumina. The insulator 642 that configures the heater is also a structural component forming the reference gas chamber 69 and also serves as a reference gas chamber formation layer.

In addition, in the solid electrolyte 1, the measured gas chamber formation layer 681 that configures the measured gas chamber 68 is laminated and formed on the measured gas surface 601A side. The measured gas chamber formation layer 681 is made of alumina. That is, the solid electrolyte 1 is in contact with the insulator 642 (that is, the dissimilar material member 4) that configures the heater 64, described above, on the reference gas surface 602A side, and is in contact with the measured gas chamber formation layer 681 (that is, the dissimilar material member 4) on the measured gas surface 601A side. The solid electrolyte 1 comes into contact with the measured gas at the measured gas surface 601A. The measured gas surface 601A can be considered to be the above-described gas contacting portion.

For example, the diffusion resistance layer 66 is made of a porous spinel body. In addition, a shielding layer 60 that is made of alumina is provided on a surface of the diffusion resistance layer 66. The shielding layer 60 is made of a dense body that does not transmit gas. The exhaust gas G that flows into the distal-end-side cover 72 passes through the diffusion resistance layer 66 and reaches the measuring portion 50 of the detection electrode 62. In the configuration of the sensor element 6 shown as an example in FIG. 12, the diffusion resistance layer 66 is not in contact with the solid electrolyte 1. However, a configuration in which the diffusion resistance layer 66 is in contact with the solid electrolyte 1 can also be used. In this case, the diffusion resistance layer 66 serves as the dissimilar material member 4.

(Solid Electrolyte)

The solid electrolyte 1 is made of partially stabilized zirconia. Specifically, the solid electrolyte described according to the first embodiment is used. The solid electrolyte 1 has a small difference in coefficient of thermal expansion with alumina and spinel. Thus, in the cooling/heating cycle, peeling and cracking between the heater 64 and the measured gas chamber formation layer 681, and the solid electrolyte 1 do not easily occur. In addition, hysteresis is small even in a cooling/heating cycle in which, for example, the solid electrolyte 1 is exposed to a high-temperature region that exceeds 1,000° C.

Therefore, cracking in the solid electrolyte 1 itself does not easily occur even when the solid electrolyte 1 is exposed to a high-temperature region. This means that, even when the gas sensor 5 is applied to use in which 1,000° C. is exceeded, the gas sensor 5 is capable of detecting measured gas while maintaining high reliability.

(Electrode)

The material of the detection electrode 62 according to the present embodiment is not particularly limited as long as the material has catalytic activity relative to oxygen and the like. For example, the detection electrode 62 can contain a composition of any of Pt (platinum), Au (gold), Ag (silver), a mixture or an alloy of Pd (palladium) and Ag, and a mixture or an alloy of Pt and Au, as a noble metal component. In addition, the material of the reference electrode 63 is also not particularly limited, and can contain Pt, Au, Ag, Pd, and the like as the noble metal component.

Figure 13:
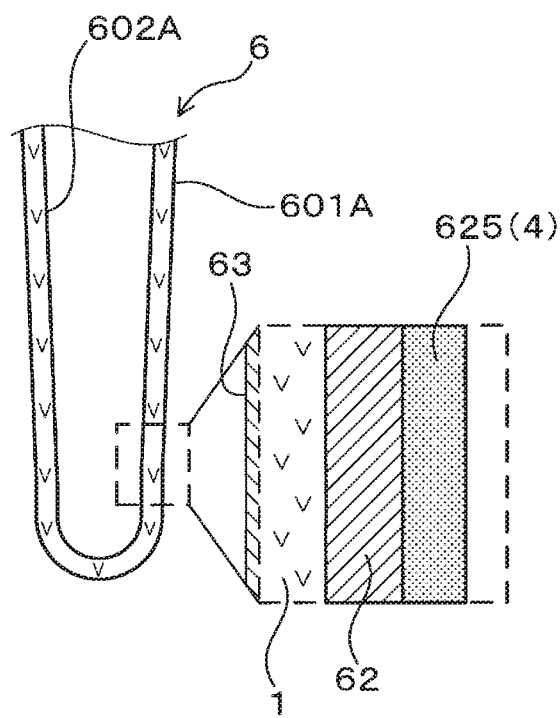
FIG. 13 is an explanatory diagram of a cross-section of a cup-type gas sensor element according to the second embodiment.

In addition, for example, as the sensor element 6, as shown in an example in FIG. 13, a bottomed-cylindrical-type (specifically, a cup-type) sensor element can also be used instead of the lamination-type sensor element. The cup-type sensor element such as this has bottomed, cylindrically shaped (specifically, cup-shaped) solid electrolyte 1, detection electrode 62, and reference electrode 63. The detection electrode 62 is provided on an outer peripheral surface 601A of the solid electrolyte 1. The reference electrode 63 is provided on an inner peripheral surface 602A of the solid electrolyte 1. In the cup-type sensor element such as this, a rod-shaped heater (not shown) is inserted inside the sensor element 6. The heat heats the sensor element 6 to a desired temperature.

The detection electrode 62 is provided on the outer peripheral surface 601A of the solid electrolyte 1. In addition, a porous protective layer 625 is formed on the outer peripheral surface 601A of the solid electrolyte. In FIG. 13, the protective layer 625 is a porous body and is, for example, made of spinel. In this case as well, in a manner similar to that in the above-described lamination-type sensor element, peeling and cracking do not easily occur between the solid electrolyte 1 and the dissimilar material member 4 such as the protective layer 625.

Therefore, even in the gas sensor 5 that includes the cup-type sensor element, the gas sensor 5 is capable of detecting measured gas while maintaining high reliability. Here, in the example in FIG. 13, the detection electrode 62 is present between the protective layer 625 and the solid electrolyte 1. However, the detection electrode 62 is not necessarily formed on the overall outer peripheral surface 601A. A non-formation portion is typically present. Therefore, although a configuration is omitted in the drawings, a portion in which the protective layer 625 and the solid electrolyte 1 are in contact is present.

In addition, the reference electrode 63 is provided on the inner peripheral surface of the cup-shaped solid electrolyte 1. However, the reference electrode 63 may be provided on the overall inner peripheral surface or may be partially provided. In cases in which the reference electrode 63 is partially provided, the alumina that configures the heater and the solid electrolyte may come into contact. In this case as well, because the solid electrolyte 1 is thermally stable, in a manner similar to that in the lamination-type sensor element, peeling and cracking between the solid electrolyte 1 and the dissimilar material member 4 such as the heater do not easily occur.

The present disclosure is not limited to the above-described embodiments. Various modifications are possible without departing from the spirit of the disclosure. That is, while the present disclosure has been described with reference to embodiments thereof, it is to be understood that the disclosure is not limited to the embodiments and constructions. The present disclosure covers various modification examples and modifications within the range of equivalency. In addition, various combinations and configurations, and further, other combinations and configurations including more, less, or only a single element thereof are also within the spirit and scope of the present disclosure.

For example, the solid electrolyte according to the first embodiment can also be used in a solid oxide fuel cell (SOFC). In this case, for example, the solid electrolyte has contact surfaces with an anode layer and a cathode layer. Although a configuration is omitted in the drawings, the solid electrolyte can be applied to a fuel cell unit cell in which the anode layer, an electrolyte layer made of the solid electrolyte, and the cathode layer are successively laminated. In addition, as a result of a plurality of fuel cell unit cells being laminated via a separator, a stack-type fuel cell can be constructed. Furthermore, as the gas sensor, there is an oxygen sensor, an NOx sensor, and the like in addition to the air-fuel ratio sensor. The solid electrolyte can also be applied to these sensors.

What is claimed is:

1. A solid electrolyte comprising:
partially stabilized zirconia in which a stabilizer forms a solid solution in zirconia, wherein:
the partially stabilized zirconia comprises at least monoclinic phase particles and cubic phase particles as crystal particles that configure the partially stabilized zirconia, and an abundance ratio of the monoclinic phase particles is 5 to 25% by volume;
the partially stabilized zirconia comprises stabilizer low-concentration phase particles of which concentration of the stabilizer at a particle center is equal to or less than 1 mol %, as the crystal particles;
the stabilizer low-concentration phase particles have a particle-size distribution of number frequency thereof having a peak at which an average particle size is 0.6 to 1.0 μm, and a particle size at 10% of a cumulative number is 0.5 μm or greater, and of the stabilizer low-concentration phase particles, 50% by volume or greater belong to the peak;
the peak is a first peak; and
the stabilizer low-concentration phase particles further have a second peak at which the average particle size is 0.2 to 0.4 μm, and the particle size at 90% of the cumulative number is 0.5 μm or less in the particle-size distribution of the number frequency.

2. The solid electrolyte according to claim 1, wherein:
of the stabilizer low-concentration phase particles, 20 to 50% by volume belong to the second peak.

3. The solid electrolyte according to claim 2, wherein:
the stabilizer comprises yttria.

4. The solid electrolyte according to claim 3, comprising:
a contacting portion that is configured such that the solid electrolyte is in contact with a dissimilar material member.

5. The solid electrolyte according to claim 4, wherein:
the dissimilar material member comprises alumina or spinel.

6. The solid electrolyte according to claim 1, wherein:
the stabilizer comprises yttria.

7. The solid electrolyte according to claim 1, comprising:
a contacting portion that is configured such that the solid electrolyte is in contact with a dissimilar material member.

8. The solid electrolyte according to claim 7, wherein:
the dissimilar material member comprises alumina or spinel.

9. A gas sensor comprising:
the solid electrolyte according to claim 1.

10. A manufacturing method of a solid electrolyte according to claim 1, the manufacturing method comprising:
- a mixing step of obtaining a mixture by mixing (i) a first raw material powder that comprises zirconia, (ii) a second raw material powder of which an average particle size is greater than that of the first raw material powder and that comprises zirconia, and (iii) a stabilizer raw material power;
- a molding step of obtaining a molded body by molding the mixture; and
- a sintering step of obtaining the solid electrolyte that comprises partially stabilized zirconia by sintering the molded body.

11. The manufacturing method of the solid electrolyte according to claim 10, wherein:
the mixing step comprises;
- a first mixing step of mixing the first raw material powder and the stabilizer raw material powder, and
- a second mixing step of further mixing the second raw material powder after the first mixing step.

12. The manufacturing method of the solid electrolyte according to claim 11, wherein:
the average particle size of the second raw material powder is equal to or greater than 0.5 μm.

13. The manufacturing method of the solid electrolyte according to claim 10, wherein:
the average particle size of the second raw material powder is equal to or greater than 0.5 μm.

* * * * *